(12) United States Patent
    Ostroff (10) Patent No.: US 8,516,392 B2
(45) Date of Patent: Aug. 20, 2013

(54) INTERACTIVE GENERIC CONFIGURATOR PROGRAM

(76) Inventor: Daniel Reuven Ostroff, Petach Tikva (IL)

( * ) Notice: Subject to any disclaimer, the term of this patent is extended or adjusted under 35 U.S.C. 154(b) by 547 days.

(21) Appl. No.: 12/872,296

(22) Filed: Aug. 31, 2010

(65) Prior Publication Data

US 2012/0054075 A1    Mar. 1, 2012

(51) Int. Cl.
    *G06F 3/48*    (2006.01)
(52) U.S. Cl.
    USPC ............. 715/800; 715/838; 715/763; 705/26; 705/27; 345/619; 382/217; 382/181; 382/254
(58) Field of Classification Search
    USPC ........................................................ 715/800
    See application file for complete search history.

(56) References Cited

U.S. PATENT DOCUMENTS

| | | | | |
|---|---|---|---|---|
| 7,353,192 | B1 * | 4/2008 | Ellis et al. ...................... | 705/26.5 |
| 7,843,466 | B2 * | 11/2010 | Hanechak ...................... | 345/619 |
| 7,946,490 | B2 * | 5/2011 | Elgar et al. ............... | 235/462.01 |
| 8,174,521 | B2 * | 5/2012 | Harvill et al. ................ | 345/419 |
| 8,331,677 | B2 * | 12/2012 | Foehr et al. .................... | 382/181 |
| 8,405,679 | B2 * | 3/2013 | Murtagh ........................ | 345/629 |
| 2003/0139840 | A1 * | 7/2003 | Magee et al. .................. | 700/133 |
| 2005/0027553 | A1 * | 2/2005 | Samet .............................. | 705/1 |
| 2005/0102199 | A1 * | 5/2005 | Lee ................................... | 705/27 |
| 2007/0024908 | A1 * | 2/2007 | Hanechak ..................... | 358/1.18 |
| 2007/0024909 | A1 * | 2/2007 | Hanechak ..................... | 358/1.18 |
| 2009/0147297 | A1 * | 6/2009 | Stevenson ..................... | 358/1.15 |
| 2010/0079480 | A1 * | 4/2010 | Murtagh ........................ | 345/592 |
| 2010/0088618 | A1 * | 4/2010 | Mayer-Ullmann ........... | 715/763 |
| 2010/0172590 | A1 * | 7/2010 | Foehr et al. .................... | 382/217 |
| 2011/0091133 | A1 * | 4/2011 | Hanechak ..................... | 382/298 |
| 2012/0290429 | A1 * | 11/2012 | Ostroff ......................... | 705/26.5 |

* cited by examiner

*Primary Examiner* — William Bashore
*Assistant Examiner* — Reza Nabi
(74) *Attorney, Agent, or Firm* — Stephen E. Zweig (57) ABSTRACT

Method and System for creating item configurators intended to run under the control of computerized devices possessing GUI. This method comprises creating a plurality of graphic layer files and graphic layer thumbnail files comprising various layers of the item desired for configuration. Generally at least some of this plurality of graphic layer files will contain some transparent pixels. The method also involves creating at least one main description file, which may be in XML format, which describes the relationships between this plurality of graphic layer files. An interactive generic configurator program (IGCP) that is capable of reading and parsing this main description file, and displaying icons on the GUI that are representative of various user configurator selections will then be used to implement the configurator, often within a web browser over the internet. The method allows users unskilled in computer programming, such as graphic artists, to create sophisticated configurator systems.

6 Claims, 9 Drawing Sheets

```
<?xml version="1.0"?>
<description>
    <heading title="Door Design">
        <assembly Pic="/door/standard.png" Thumb="/doorThumbs/standard.png" Title="standard" Attributes="None"></assembly>
        <assembly Pic="/door/premium.png" Thumb="/doorThumbs/premium.png" Title="premium" Attributes="None"></assembly>
    </heading>
    <heading title="Upper Window">
        <assembly Pic="/door/circle.png" Thumb="/doorThumbs/circle.png" Title="circle" Attributes="glassTypes.xml"></assembly>
        <assembly Pic="/door/square.png" Thumb="/doorThumbs/square.png" Title="square" Attributes="glassTypes.xml"></assembly>
        <assembly Pic="/door/diamond.png" Thumb="/doorThumbs/diamond.png" Title="diamond" Attributes="glassTypes.xml"></assembly>
        <assembly Pic="/door/sun.png" Thumb="/doorThumbs/sun.png" Title="sun" Attributes="glassTypes.xml"></assembly>
        <assembly Pic="/door/star.png" Thumb="/doorThumbs/star.png" Title="star" Attributes="glassTypes.xml"></assembly>
    </heading>
    <heading title="Door Knob" width="230" height="220">
        <assembly Pic="/door/handle.png" Thumb="/doorThumbs/handle.png" Title="handle" Attributes="None"></assembly>
        <assembly Pic="/door/roundKnob.png" Thumb="/doorThumbs/roundKnob.png" Title="Round Knob" Attributes="None"></assembly>
        <assembly Pic="/door/eggtimerKnob.png" Thumb="/doorThumbs/premium.png" Title="Eggtimer Knob" Attributes="None"></assembly>
    </heading>
</description>
```

```
<attribute>
    <textures title="Glass Types">
        <type Texture="/door/clearGlass.png" Thumb="/doorThumbs/clearGlass.png" Title="Clear Glass" Blendmode="Multiple"></type>
        <type Texture="/door/frostedGlass.png" Thumb="/doorThumbs/clearGlass.png" Title="Frosted Glass" Blendmode="Multiple"></type>
        <type Texture="/door/sunshinePattern.png" Thumb="/doorThumbs/clearGlass.png" Title="Sunshine Pattern" Blendmode="Multiple"></type>
    </textures>
</attribute>
```
— 314

INTERACTIVE GENERIC CONFIGURATOR PROGRAM

BACKGROUND OF THE INVENTION

1. Field of the Invention

Systems and methods for ecommerce relating to customizable and personalizable products, in particular web based ecommerce systems.

2. Description of the Related Art

In the field of Internet ecommerce, it is desirable to enable users to easily define the desired configuration of an item or product they wish to buy. For example, a user, upon viewing a product of interest on an Internet website, using his or her web browser, may wish to evaluate various versions of the product that may have various, colors, designs, peripherals or other options, see what the product would look like and cost given the various options chosen, and then make an informed buying decision based upon this evaluation. Software (often web server and web browser software) that enables such experimentation is often called a "product configurator" or simply "configurator" software.

A number of high-end manufacturers and retailers have implemented such product configurators on their websites. The Nike corporation, for example, operates a tennis shoe configurator that allows potential customers to create their own customized tennis shoes by selecting the material and colors of the Nike "swoosh" logo, the material (e.g. suede, coated leather, mesh, or leather with graphics) of the accent, underlay, tip/heel/tongue of the shoe, as well as the shoe's lace color, midsole color, and toe bumper color. The website allows the user to view the final product with these various color selections, and either share the results with other users, save the results, or purchase the tennis shoe.

Although such product configurators give customers an unprecedented amount of design freedom, and also represent great product sales tools, prior art product configurators, such as the Nike configurator, were generally purpose built—i.e. custom designed for a specific product and a specific company, and thus were extremely expensive to develop. Such prior art purpose-built configurators also lacked standardization, because each generally had their own unique graphic user interface (GUI) and modes of use. Thus product configurators were generally reserved for large organizations or at least well financed organizations.

Prior art configurators are described in U.S. Pat. Nos. 7,353,192, 7,584,155, 7,650,296; U.S. patent applications 20050102199, 20040113945, 20050027553, and 20030172003.

BRIEF SUMMARY OF THE INVENTION

In one embodiment, the invention may be an interactive generic configurator generator system and method. That is, the invention may be a software program, capable of running on standard computer processors such as the popular Intel/AMD x86 processors, or other processors, that enables designers and artists relatively unskilled in computer programming to input various graphics and various design rules intended to produce a configurator for a particular item, and the software and methods of the invention will then take these input graphics and design rules and output a configurator for the item of interest, here called an item or product configurator. This item or product configurator may then, for example, be uploaded to an Internet web server intended to provide information pertaining to the item or product of interest.

Customers and other persons interested in the item or product of interest may then, for example, access this website, run the Configurator using their particular web browsers, and experiment with various item or product configurations whenever they desire. The net effect of the invention is thus to both cost-reduce and deskill the process of producing product configurators, and make it more feasible for smaller, organizations and businesses to provide their customers with the benefits of item or product configurators. Furthermore, since the invention's "generic" configurator may have a layout and functionality that is consistent over many different items or products, end users may find it easier to operate.

At the highest level, the invention may be a method or system of creating or operating an item (e.g. a product) configurator intended to run under the control of at least one processor in at least one computerized device possessing a GUI. This, method or system may comprise creating a plurality of graphic layer files and graphic layer thumbnail files (these graphic layer thumbnail files will often be icons that represent or symbolize the content associated by the particular graphic layer file that the thumbnail file is associated with). The graphic layer files will usually represent or comprise comprising various layers of the item or product intended to be configured.

Often, at least some of this plurality of graphic layer files will contain some transparent pixels. This can be done to facilitate a simplified software "stacking" process in which various layers (graphic layer files) can be combined to create an overall image of a particular item configuration. Although the different graphic layer files need not all have the same dimensions (e.g. height, width) in terms of pixels, often the design of the configurator system and software can be simplified by adopting the convention that all of the different graphic layer files will have the same dimensions in terms of pixels. This way additional code that specifies the precise location of certain item options need not be done, and instead this information is simply contained in the various graphic layer files themselves. Alternatively in more complex versions, the various graphic layer files can have different dimensions and suitable code can be provided to correctly align the various graphic layer files to create the image "stack" that represents a particular configuration of the item of interest.

The various graphic layer files and associated graphic layer thumbnail files (icons) can then be associated and their role in various item configurations defined by creating at least one main description file that describes the relationships between these files. The various graphic files and the main description file can then be read by an interactive generic configurator program (IGCP). This IGCP will read and parse these files, display icons on a Graphic User Interface (GUI) representative of various item configurator options, and can then be selected and used by the user as appropriate. The system will then generally save the user selected options upon exit from the IGCP for subsequent use.

The invention's software and methods enable designers who otherwise have little or no knowledge of programming to design and implement their own configurators. These designers may either manipulate the main description file using standard text editing programs, or alternatively manipulate the main description file using suitable wizard programs.

More specifically, the deskilled methods of the invention allow designers to design sophisticated configurators using simple and everyday graphics editing programs and data file manipulating programs. These graphics programs may be popular and generally universally used graphics programs such as Adobe Photoshop, the GIMP, and the like which are used to generate input graphic files. The relatively simple input data files, required by the invention (such as headings and product details) may either be entered directly into the invention's software, or alternatively and more commonly may be entered using common and everyday text or word processing editors such as Microsoft word, OpenOffice, and the like.

Thus, using the invention, smaller manufacturers and artisans who would like to offer their products online and enable users to customize the products and define the exact look, design, functionality and coloring of the product they wish to purchase; may easily generate configurators for their products at minimal cost.

BRIEF DESCRIPTION OF THE DRAWINGS

FIG. 2 shows an example of a main description file, here shown in XML format, that conveys information pertaining to the relationship between the various graphic layer files and thumbnail files (icons) used by the IGCP. Here this file is used to describe a configurable door.

DETAILED DESCRIPTION OF THE INVENTION

Nomenclature: The interactive generic configurator generator program will often be referred to in this specification in the alternative as an IGCP, a generic configurator generator program, a configurator generator program, or sometimes, depending upon context, as the configurator.

The generic configurator generator program enables users to configure an object or objects. The chosen configuration can then be communicated in order to define objects or to order them for manufacture.

The main elements of this IGCP method, software, and system include one or more of the following:
a. graphic files
b. data files
c. The interactive generic configurator program running in display mode and interactive configurator mode.
d. An optional configurator editor and creation wizard or program.

The graphic files will typically contain several layers of graphics. When some of these layers are displayed and overlaid or superimposed on top of each other (by software) they form a picture, illustration or description of the object or objects that are to be configured. For some or all of the layers, alternative layers can be provided so that when displayed, they present a different version or configuration of the object or objects.

In order to show the configured object from multiple angles, the pictures/illustrations used can depict multiple angles/views of the object such as rear, front, right and left views of the object. In some embodiments a rotatable 3D representation of the object such as a Flash .fla file can also be used.

One or more data files, often called main description files or MDF, define information about the configurable object, the headings or menu for the configurator, the links to the graphic files, thumbnails and icons as well as details such as the available fabrics, colors and pricing of the alternative configurations. These main description files may be created using a variety of formats. One convenient format is the XML (extensible markup language) format, and many of the specific examples in this disclosure will be XML based main description files.

According to the invention, a designer, who often will be an artist who may be reasonably adept at manipulating images using a graphics design program, but who otherwise need not know much about programming, may produce a IGCP based product configurator by the following steps:

In this example, assume that the designer wishes to produce a configurator for a simple chair or stool composed of a base to sit on, which may be available in various fabric patterns, various and various type of leg options.

EXAMPLE

1: The process will often start by the designer preparing an initial picture or drawing of the object. This can be, for example, a photograph or illustration of the product, such as a photograph of the stool. Often this will be a series of photographs, such as a series of photographs of different chairs or stools with different seats, seat fabrics, and different types of stool bases (legs), preferably done under similar lighting conditions, camera angles, and magnifications.

2: The designer will often then use a conventional graphics program, such as Adobe Photoshop or other program, to separate various elements of the item where configuration or customization is desired and place these elements into separate graphic layers files. For example, assuming that a chair is being configured, the designer may separate the seat of the chair from the base of the chair. This will result in various graphic layers such Layer1: Seat0, Layer2: Base0, and so on.

3: The designer will then create alternative elements (i.e. the alternative configuration options) as additional layers. Thus for a chair, this can be variations of the chair base. This will result in various variation layers such as Layer3: Base1 (Three Straight Legs) and/or Layer4: Base2 (Triangular Base).

4. The designer will then save all layers as graphic files. This will result in the creation of various layers such as Seat0.gif, Seat1.gif, Seat2.png, Base0.gif, Base1.gif, Base2.gif, and so on.

5: The designer will then create graphic files for the thumbnails (icons) images used to symbolize the various configuration options and their configuration options. This will result in various files such as ThumbSeat0.gif, ThumbSeat1.gif, ThumbSeat2.png, ThumbBase0.gif, ThumbBase1.gif, ThumbBase2.gif, and so on.

6: The designer will then create the main description file (often in XML file format) for the configurator definitions. This will result in a file such as myChair.xml 7: The designer may then add additional optional information to the main description file. For example, the designer may add supported patterns for the chair seat/option, which might for example be various fabric patterns or designs put into an attributes file as fun patterns.xml 8: A designer wishing to create a web enabled version of the configurator for ecommerce purposes, for example, may then store the various files on a suitable web server or other ecommerce server. Thus, for example, files such as myChair.xml, ThumbSeat0.gif, ThumbSeat1.gif, ThumbSeat2.png, ThumbBase0.gif, ThumbBase1.gif, ThumbBase2.gif, and so on will be stored in a form that can be accessed by a web browser that is retrieving data from a web page that runs this particular configurator.

9: Once the configurator and the various support files are loaded on a web server, then essentially any user in the world with access to the Internet and a web browser may then visit the appropriate web site, and run the IGCP or configurator program by, for example, clicking on icon on a webpage that shows the object to be configured.

10. This user can then choose the item or product to be configured. For example the user may click on an item labeled myChair, which in turn that loads the myChair.xml data and displays the configurator.

11. This user can then configure the product, and optionally click on an order button when the user wishes to purchase the product, click on a save button if the user wishes to resume configuration later, click on a share button to share the configuration with someone else, and so on.

Thus, in one embodiment, the invention is a software system and method for creating an item configurator intended to run under the control of at least one processor in at least one computerized device possessing a GUI. This method will generally comprise creating a plurality of graphic layer files and graphic layer thumbnail files comprising various layers of the item desired for configuration. Generally at least some of this plurality of graphic layer files will contain some transparent pixels. The method also involves creating at least one main description file, which may be in XML format, which describes the relationships between this plurality of graphic layer files. An interactive generic configurator program (IGCP) that is capable of reading and parsing this main description file, and displaying icons on the Graphical User Interface (GUI) that are representative of various user configurator selections will then be used to implement the configurator.

Thus the GUI of the configurator can be used interactively by the user to configure a product. Generally the user chooses an element of the object that the user wishes to configure and a number of thumbnails (icons) of various optional configurations of the chosen element are displayed under the specific heading. When the user clicks on a different thumbnail or icon, the corresponding graphics file layer is immediately replaced with an alternative graphics file layer that corresponds to the chosen thumbnail or icon. Similarly, when a user picks a specific value for an attribute such as pattern, this attribute (the pattern in this case) is applied to the selected element. The application of the attribute can be done by simply replacing the layer with a new layer in which the attribute is applied or by blending a graphic layer associated with the attribute with the non-transparent pixels of the layer using standard blending algorithms such as Multiply, Overlay, and Dissolve.

Figure 1:
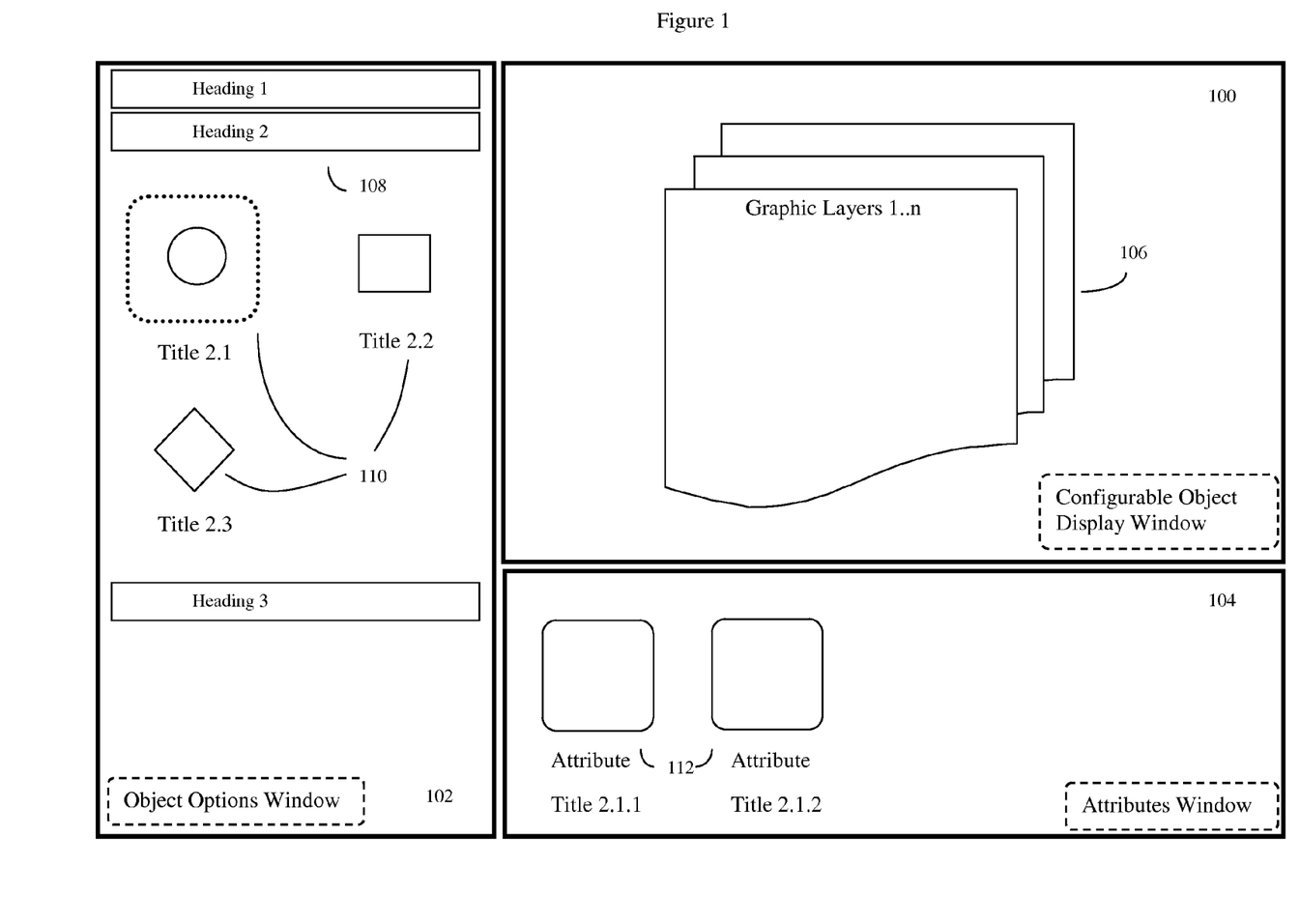
FIG. 1 shows the GUI of an interactive generic configurator program (IGCP) showing some of the key elements including a configurable object (item) display window, an object (item) options window, and an attributes window.

FIG. 1 shows the GUI of the an interactive generic configurator program (IGCP) showing some of the key elements including an configurable object (item) display window (100), an object (item) options window (102), and an attributes window (104). The image of the object (item, product) itself is built up by the software superposition of multiple graphic layer files (106), here shown as Graphic Layers 1 . . . n. The heading section titles are shown as (108), and the assembly definitions corresponding to heading 2 are shown as (110), along with their associated thumbnail files or icons. The various attributes that may be associated with these assembly definitions are shown as (112).

Typically, the main description file will have a plurality of heading sections. Each heading section in turn will have a heading and at least one assembly definition. These assembly definitions essentially correspond to the various configuration options. Here each at least one assembly definition will have and be associated with at least one graphic layer file, usually at least one thumbnail graphic layer file (icon), as well as at least one assembly title descriptor. The assembly definitions will optionally also link to an associated description file that can be used to more precisely define the attributes of the at least one assembly definition.

Thus the main description file also defines each of the thumbnail graphics to be displayed for a specific heading, and how these are applied, as options for the Heading. Each object option (or thumbnail or icon) will often also have a title associated with it that is also defined by the main description file.

FIG. 2 shows an example of a main description file, here shown in XML format, that conveys information pertaining to the relationship between the various graphic layer files and thumbnail files (icons) used by the IGCP. Here this file is used to describe a configurable door. Here section (208) corresponds to a heading (previously shown as (108) in FIG. 1). Section (210) corresponds to the various assembly definitions (previously shown as (110) in FIG. 1). An example of a linked associated description file, (here another XML file) is shown in (212). This was shown visually in FIG. 1 as 112.

Figure 3:
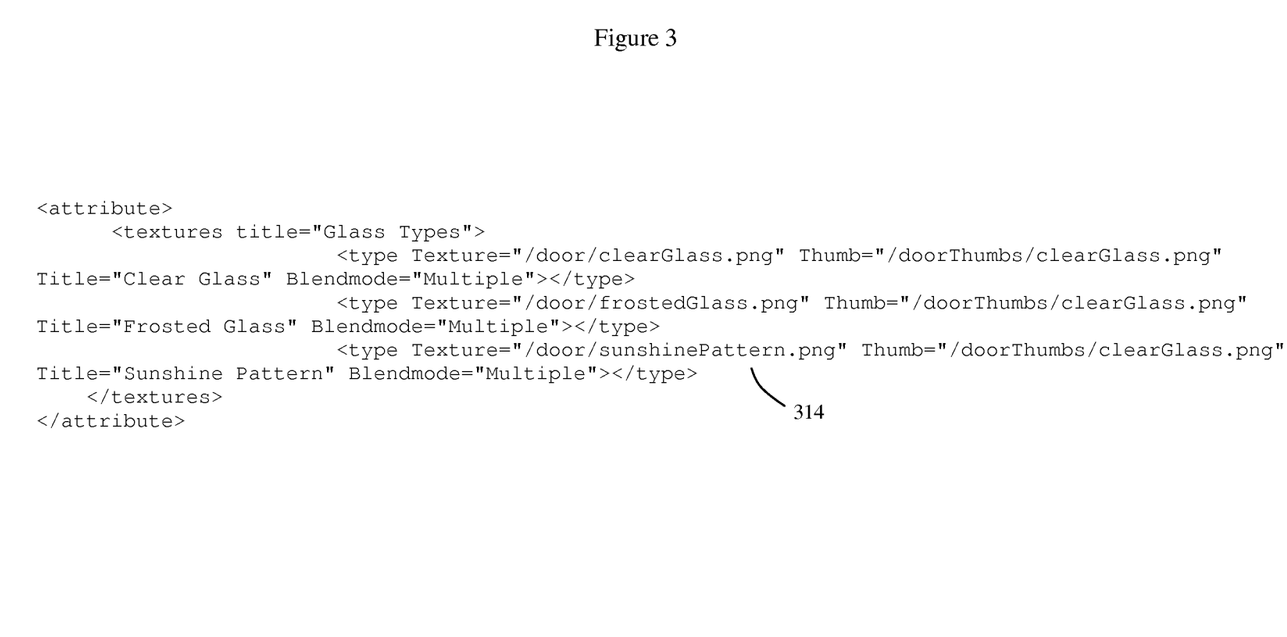
FIG. 3 shows an example of an associated description file, here shown in XML format, that defines the attributes of at least one object (e.g. item, product) assembly. Here the attributes of the glass window for this configurable door are given.

FIG. 3 shows an example of an associated description file, here shown in XML format, that defines the attributes of at least one object (e.g. item, product) assembly. This corresponds to the glassTypes.xml file previously called or linked to by (212) in FIG. 2. Here the attributes of the glass window for this configurable door are given. The various .png files (312) call thumbnail sized graphics (icons) which correspond to the icons of the attributes (112) in FIG. 1, as well as the specific glass attributes (412) shown in FIG. 4. Thus for example, the icon of Sunshine Pattern glass (414) shown in FIG. 4 is linked by the reference to sunshinePattern.png in FIG. 3 (314).

Figure 4:
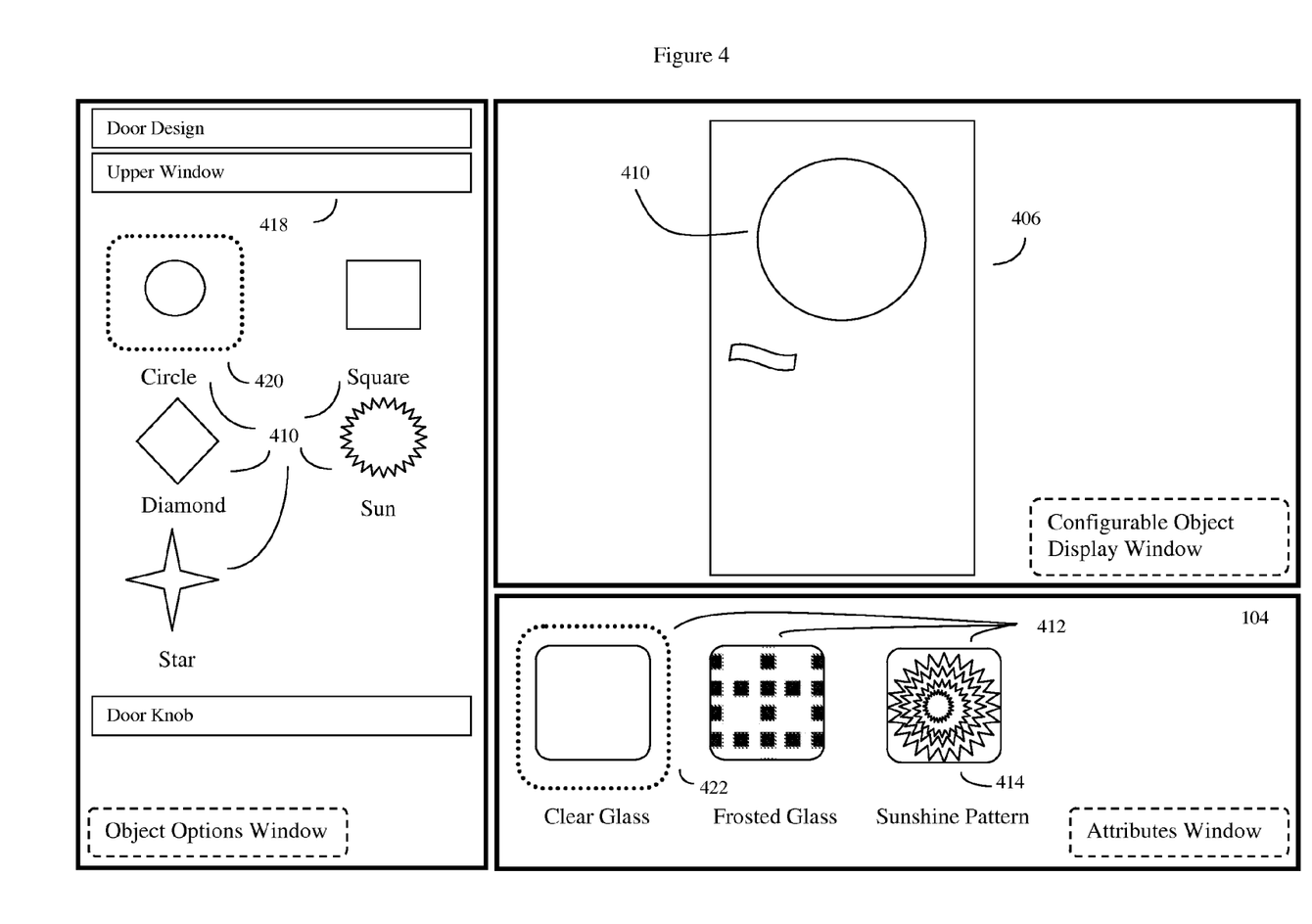
FIG. 4 shows an example of the IGCP being used to configure various options for a door. Here the focus is on the shape of the glass to be used in the upper window of the door, and on the attributes (i.e. type) of glass that may be used to configure the door. Here the user has selected a round window in the object options window, clear glass in the attributes window, and this is shown on the door.

Thus for example, consider a configurator for a door in FIG. 4 (406), which may have a front window inside it made of glass (410). The shape of the glass can be defined by the various assembly definition sections of the main description files. The attributes of this glass (for example is the glass clear or frosted or sunshine pattern), can in turn be defined by various associated description files associated with the front window assembly definitions.

Typically, the application of an attribute such as a color or pattern is carried out by applying commonly used blending algorithms, similar to those used in software like Flex or Photoshop, again using blendmodes such as overlay, multiply, or dissolve.

FIG. 4 shows an example of the IGCP being used to configure various options for this type of door. Here the focus is on the shape of the glass to be used in the upper window of the door, and on the attributes (i.e. type) of glass that may be used to configure the door. Here the user has selected a round window in the object options window (420), and clear glass in the attributes window (422), and these selections have been taken by the IGCP and have been incorporated onto the graphic of the door (406) (410).

Figure 5:
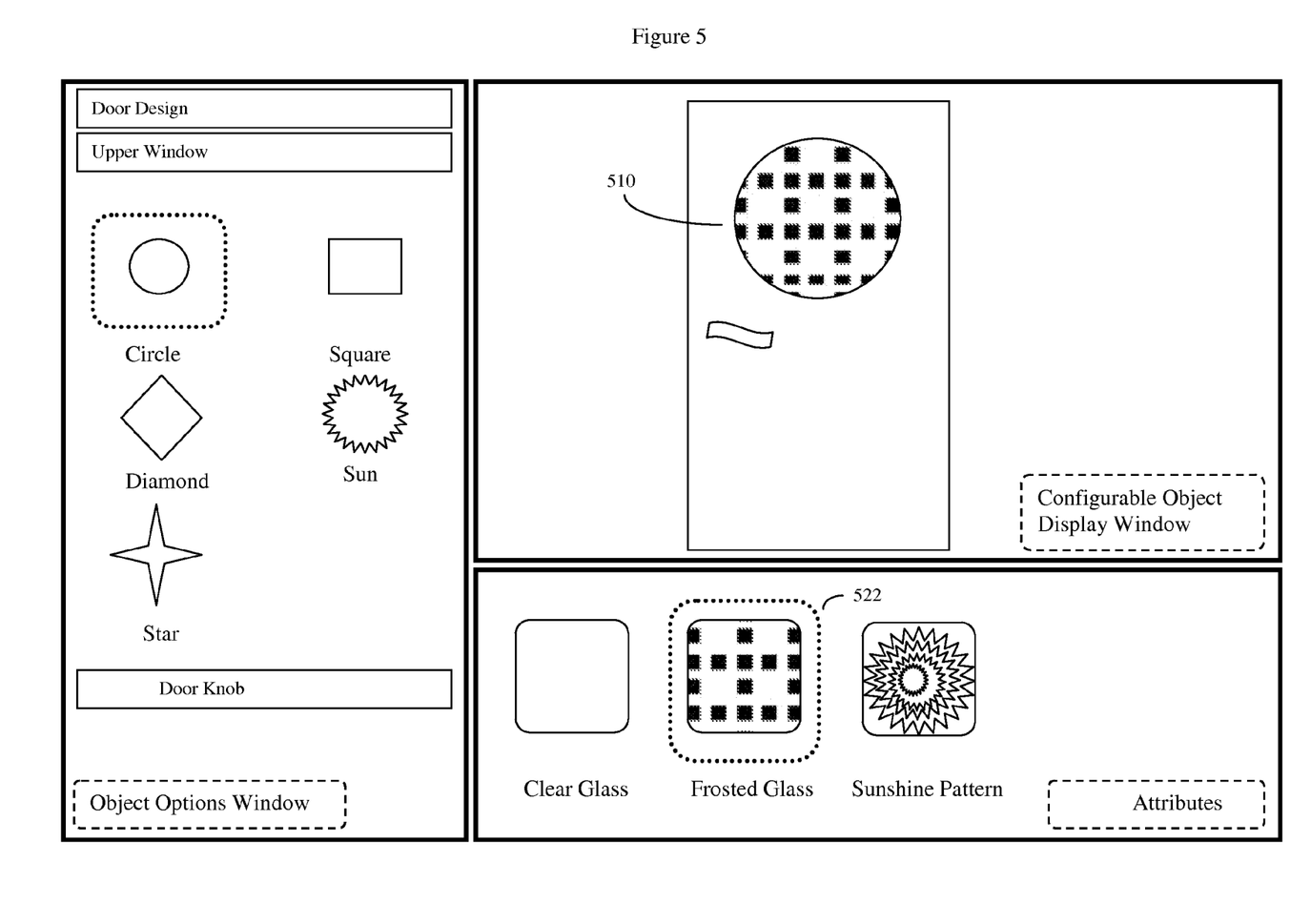
FIG. 5 shows how the appearance of the object (i.e. item, product) in the configurable object display window (here the door) changes when the user changes a particular attribute. Here the user has now decided to choose a frosted glass attribute in the attributes window, and this is now shown on the door.

FIG. 5 shows how the appearance of the object (i.e. item, product) in the configurable object display window (here the door) changes when the user changes a particular attribute. Here the user has now decided to choose a frosted glass attribute in the attributes window (522), and this is now shown on the door (510).

Figure 6:
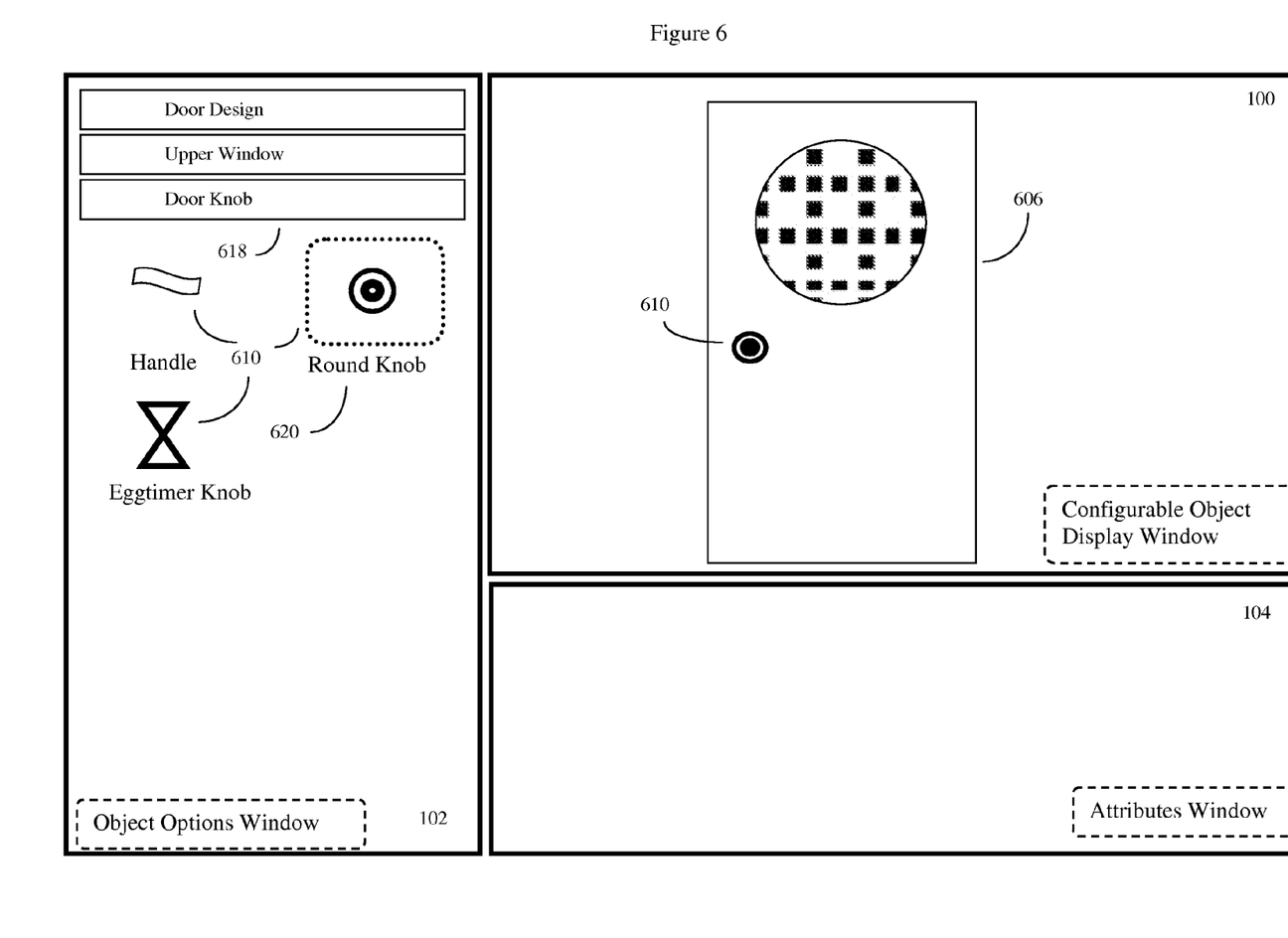
FIG. 6 shows how the appearance of the door object (i.e. item, product) in the configurable object display window changes when another option is chosen. Here the focus is on the type of doorknob used on the door. The user has chosen the round knob, and this is shown on the door. In this example, there are no additional attributes associated with the type of doorknob option, so the attributes window is blank.

In FIG. 6, the user has either clicked on the heading "Door Knob" (618) in the object options window (102), or alternatively clicked on the Door Knob itself (610) in the configurable object display window (100). Either operation may cause the icons of the various options of the door knobs (610) to be displayed in the object options window (102). Also shown in FIG. 6 is how the appearance of the object (i.e. item, product) (606) in the configurable object display window (100) changes when another option is chosen. Here the focus is on the type of doorknob used on the door (620). The user has chosen the round knob, and this is shown on the door (610). In this example, there are no additional attributes associated with the type of doorknob option, so the attributes window (104) is blank.

Figure 7:
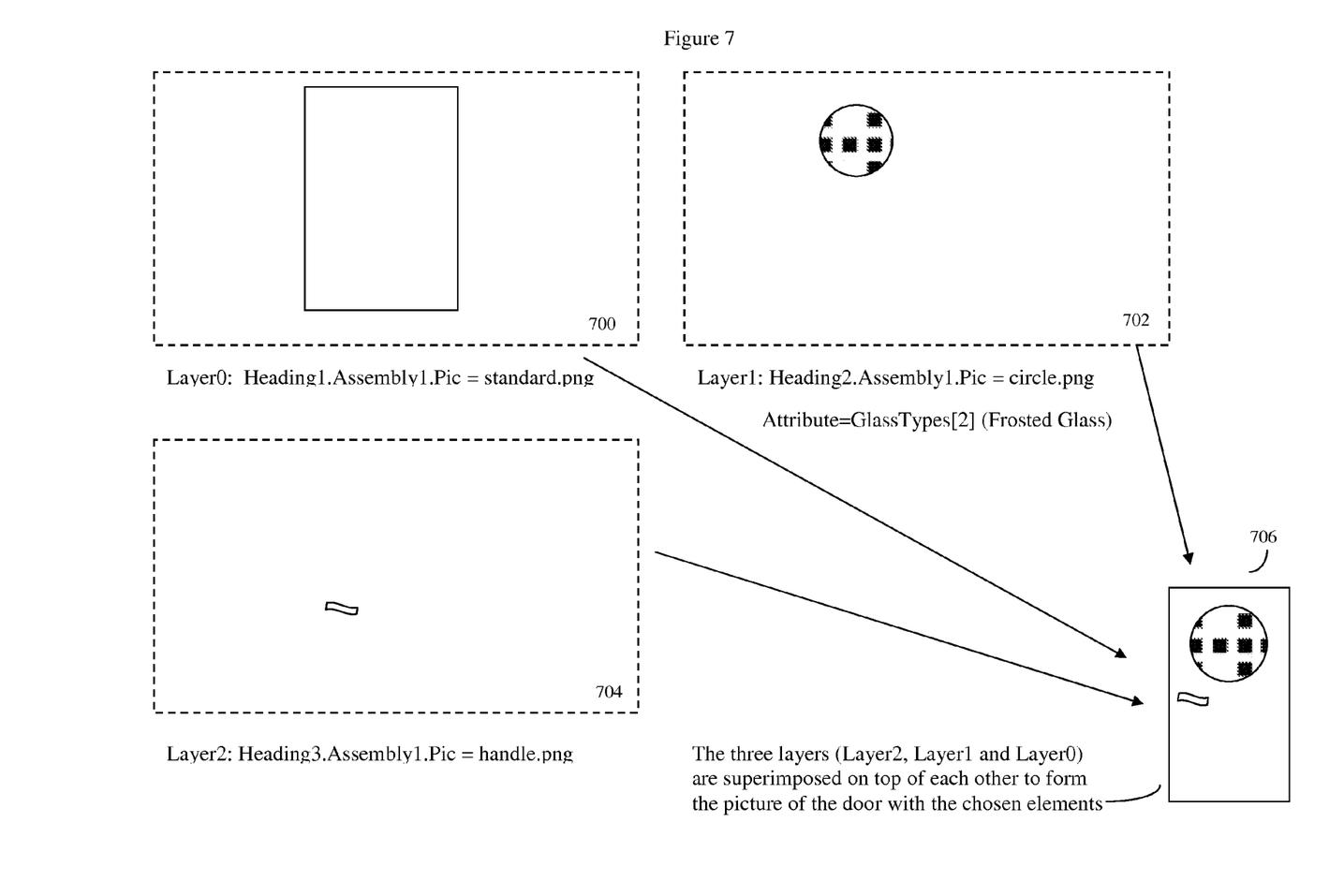
FIG. 7 shows how the IGCP software essentially creates a software "virtual stack" or assembly of the different graphic file layers to create the final image of the object, item, or product in the configurable object display window. Here the different graphic layer files have the same size, and contain a large number of transparent pixels, allowing the different options to be easily assembled by software into the composite image of the configured door.

FIG. 7 shows how the IGCP software essentially creates a "virtual stack" or assembly of the different graphic file layers (700), (702), (704) to create the final image (706) of the object, item, or product in the configurable object display window. Here the different graphic layer files have the same size, and contain a large number of transparent pixels, allowing the different options to be easily assembled by software into the composite image of the configured door (706).

The IGCP can be implemented using various programming languages and techniques. In one convenient method, the IGCP may implement a program loop wherein for each heading section in the at least one main description file, the IGCP will first read the heading describing a particular class of configuration options (e.g. various types of door knobs for a door), and display this heading onto the configurator GUI.

The IGCP may then read the first assembly definition (the default assembly) of each heading and display the graphic layer file associated with this assembly definition into the configurator GUI configurable object display window as well. For example, the IGCP might select the first specific door knob assembly definition under the general doorknob class of configuration options and show this as the first default version of the item, object, or product that is shown to the user before the user makes any selections of substitutions. Often this first assembly definition will be a version that the manufacturer might like to suggest, such as the most popular version, or possibly the most profitable version of this assembly. For example, for doorknobs, a round doorknob might be selected as the first assembly definition.

Figure 8:
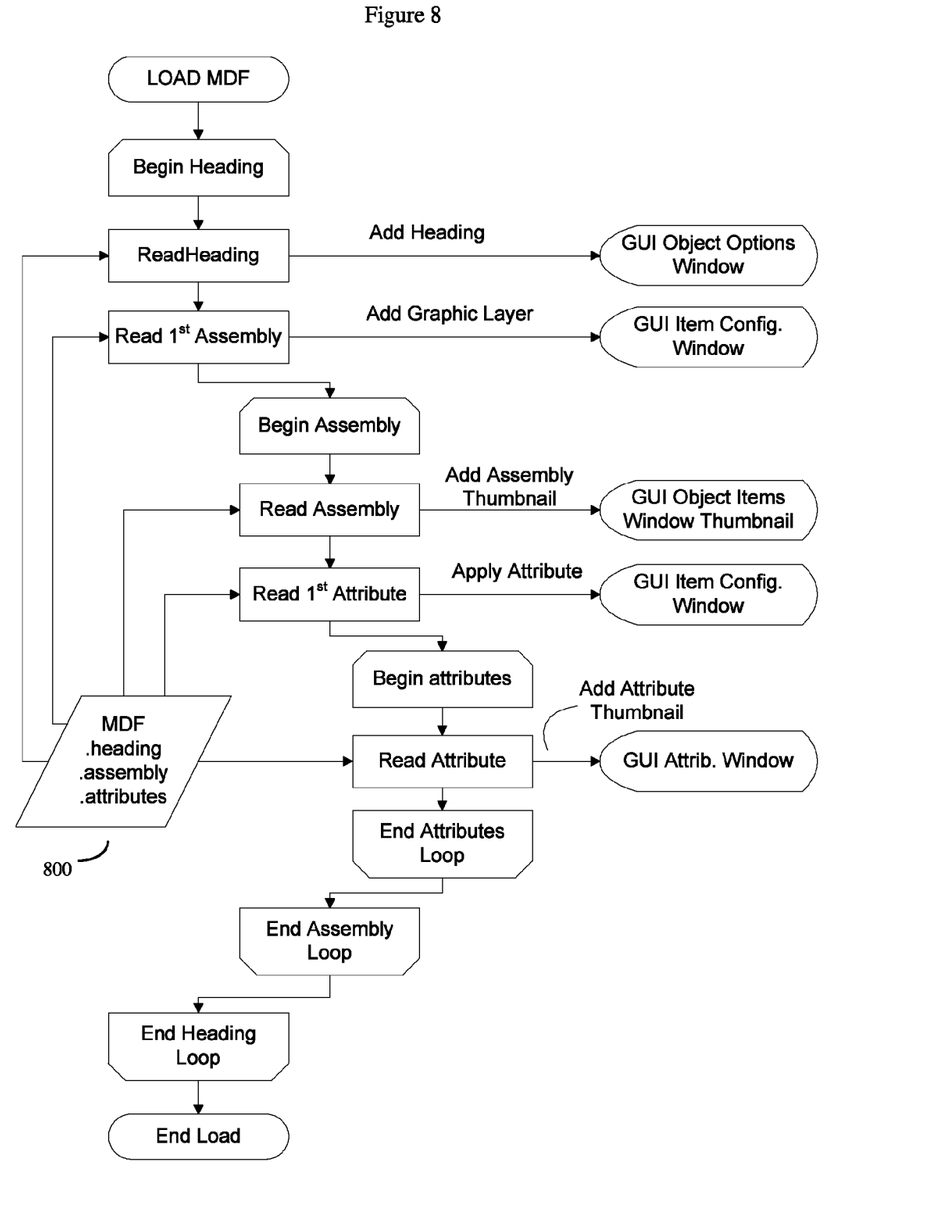
FIG. 8 shows a flow chart showing some of the key steps employed by the IGCP software as it loads the data from the main description file (MDF) and associated description file (that defines the attributes of various assembly definitions), as well as the various graphic files called by or associated with these files.

FIG. 8 shows a flow chart showing some of the key steps employed by the IGCP software as it loads the data from the main description file (MDF) and associated description file (that defines the attributes of various assembly definitions), as well as the various graphic files called by or associated with these files. Here the main description file MDF (800) may be, for example, the file previously shown in FIG. 2, and the attributes file may be, for example, implemented by the file previously shown in FIG. 3. The IGCP program may, for example, load the data and figures employing a series of nested software loops, and may make optional use of a convention that the first assembly falling under a particular heading is the default assembly, or use other convention as appropriate.

Other information may also be included with the assembly definitions. This other information may include, for example, one or more codes representing a price category that can be used to calculate and display the impact of choosing said assembly definition on the price of said item. For example, if a fancy doorknob shaped like an egg timer is more expensive than a standard round doorknob, the assembly definition file might include this price information, display the price along with the various assembly object options, and/or also use this price information to calculate the final price of the item, object or product being configured.

Sometimes the choice of one type of assembly option may exclude the choice of a different type of assembly option. For example, the two choices may be incompatible with each other. To cope with this issue, in some alternative embodiments of the invention, at least some of the assembly definitions may contain one or more interdependency codes that either disable use of other assembly definitions if that assembly definition is chosen by said user, or disable use of a particular assembly definition if the use of another assembly was chosen by the user.

In any event, the IGCP will then read the other assembly definitions under their general headings, and if a particular assembly definition contains a link to an associated description file, then said generic configurator program may apply the attributes associated with this associated description file to the at least one graphic layer file associated with this assembly, and also display these attributes in a GUI attribute display window as additional attributes that may be applied should the user click on one of these attributes in the GUI attribute display window.

Thus, again using the door configurator from FIG. 4 as an example, suppose that under the upper window heading (418) (see FIG. 2-208 for the corresponding code or data) used to show a variety of different upper glass windows for the door (410), the various glass shapes defined under the various assembly definitions (see FIG. 2-210 for the code or data) contain one or more links (see FIG. 2-212 for an example) to a glass types attributes file (shown in FIG. 3). The IGCP will read this glass types attribute file, and both show the option on the door, and show one or more icons for this option (412) in the attributes window (104) of the GUI.

A number of different types of attributes are possible. These include, but are not limited to colors, patterns, textures, fabrics, materials, and available sizes.

Thus for each assembly definition, the IGCP will generally display the associated thumbnail graphic layer file as an icon associated with the display of this heading onto the IGCP GUI, and also display at least one assembly title descriptor associated with this display of this heading on the IGCP GUI.

Thus if a user of the configurator selects an icon on the GUI, (e.g. FIG. 4-410) the IGCP will replace the associated graphic layer files in the IGCP item configuration window with a new graphic layer file associated with the selected icon, as well as apply the defined attributes specified by the linked associated description file associated with the selected icon onto the assembly. Further, when the user indicates on the GUI interface that he or she is finished, the IGCP will usually save a record of the icons or more precisely the options represented by the icons that have been selected by the user.

Figure 9:
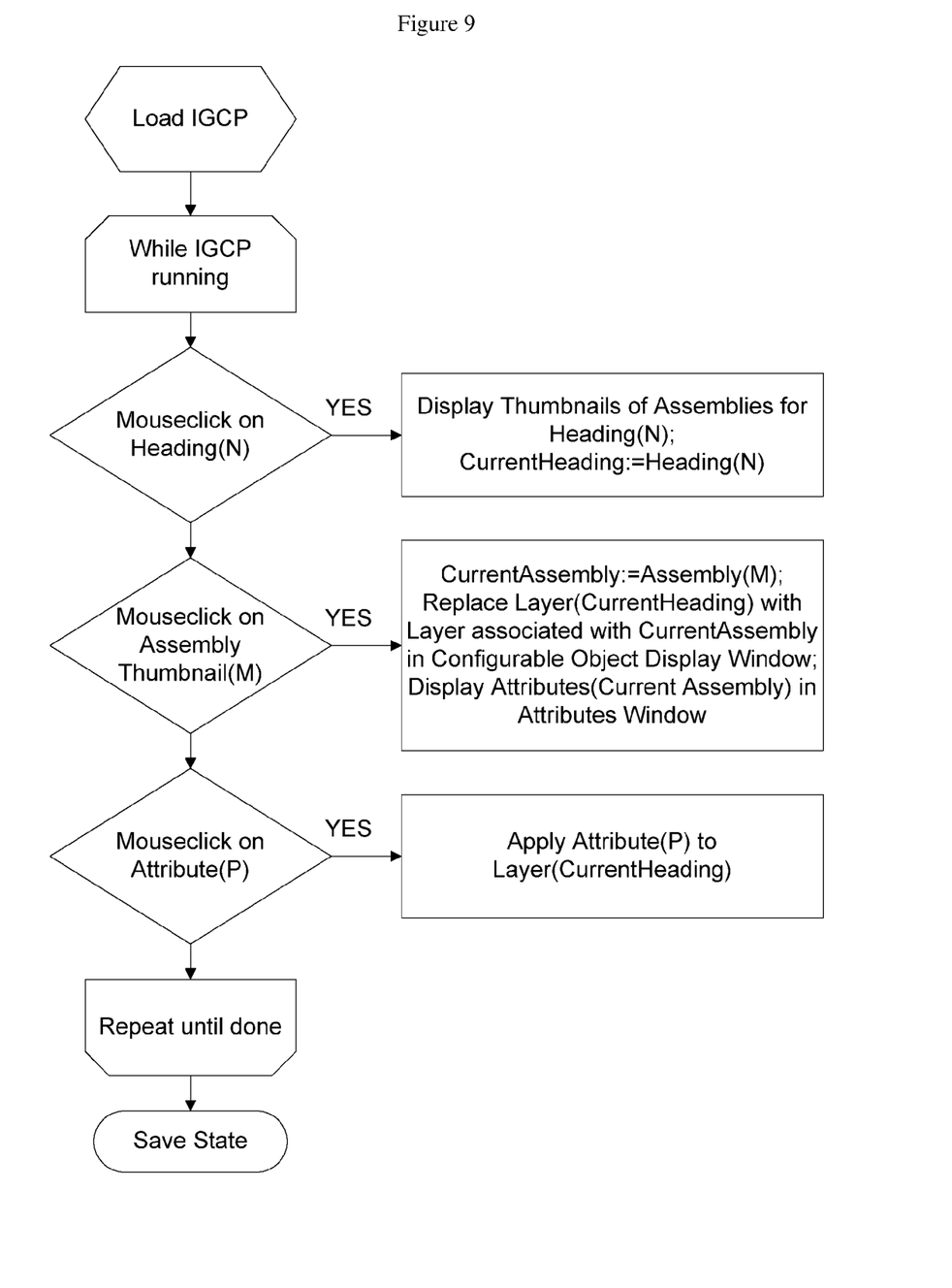
FIG. 9 shows a flow chart showing some of the key steps employed by the IGCP software as it runs in configurator mode. As the user clicks on various options (heading, assembly, attributes), the IGCP selects the appropriate graphics files associated with the particular selection and constructs a new composite image of the configured object, item or product, and displays it in the IGCP configurable object display window. When the user is finished, the IGCP will normally save the state of the object, item, or product (i.e. what options the user ended up selecting) for later use.

FIG. 9 shows a flow chart showing some of the key steps employed by the IGCP software as it runs in configurator mode. As the user clicks on various options (heading, assembly, attributes), the IGCP selects the appropriate graphics files associated with the particular selection and constructs a new composite image of the configured object, item or product, and displays it in the IGCP configurable object display window (100). When the user is finished, the IGCP will normally save the state of the object, item, or product (i.e. what options the user ended up selecting) for later use.

As can be seen by the examples on FIGS. 2, and 3, the actual main description files and associated description files used by the IGCP need not be very complex, and indeed may be standard XML files that can be edited by nearly any text editor. However in some situations, the designers or configurator artists may want a still simpler method to produce the main and associated description files. Here in order to simplify the process even further, one or more types of automated wizard programs may be constructed to automatically produce the description files by, for example, a designer's selection of configurator options and modes of operation on the graphical user interface of an auxiliary or built-in wizard program.

As previously discussed, in some embodiments, it will be useful to simplify construction of the IGCP and the configurator system by imposing the restriction that all graphic layer files must have the same width and height dimensions in terms of pixels. This way all of the graphic layer files may be superimposed on each other to produce a composite image without the need to specify the relative location of any particular graphic layer file relative to another particular graphic layer file. In this scenario, often most or all of the plurality of graphic layer files will contain at least some transparent pixels, with the possible exception of those graphic layer files that may be intended to represent the background area of the GUI displayed image.

The invention is particularly useful for Internet based server—web browser based ecommerce methods. Although the IGCP program may be run on a web server, often it will be more convenient and give the user faster operation if the IGCP is instead run on the user's local computerized device, such as inside the user's local web browser.

Here although the IGCP may originally reside on the web server, it may be uploaded to the user's web browser when the user clicks on, for example, a particular web page. The IGCP can in turn access and upload various graphic layer files and graphic thumbnail files (icons), main description files, and association description files from the web server as needed.

For these and other applications, often it will be useful to include additional program code to enable the user to optionally save the current state of the configurator. This will enable the user to stop work, and continue working at a later time. Here the configuration may be saved by, for example, one or more data files describing which elements the user chose and any additional information about changes that the user made to the configurator displayed item. These may be stored on the user's local computerized device, for example in the form of small "cookie" files commonly used by web browsers, or alternatively saved on the web server or in a database available to the web server.

Alternative embodiments of the invention include embodiments that enable the user to order the item or add the item to a shopping cart. Here for example, the steps of ordering the item or adding the item to a shopping cart can be done by saving the data describing which elements the user chose, and any additional information about changes the user made to the configurator displayed item, usually by creating one or more data files or writing to one or more data files, for example to files in a database such as a MySQL database. This data can then be used by a recipient of the order to determine the exact required configuration of the ordered Item the user wants. When these options are done, often it may be desirable to also generate a graphic file of the final configuration of the item and attaching this graphic file to the order or to the shopping cart webpage/form in order to prevent confusion and assure the user that the correct configuration has been selected and ordered.

In addition to being used to configure items or products made by single manufacturer, the methods of the present invention may also be useful for coordinating communication between the manufacturer and third party suppliers for certain custom parts as well. For example, consider the door configurator previously discussed. A third party manufacturer of custom door knobs may wish to provide photos of their particular product to the door manufacturer, and the door manufacturer may desire this since in general, the more custom options are available to customers, the higher the demand will be for the door. These photos may be converted to suitable configurator graphic layer files.

Here the invention may be used to more easily enable the third party door knob manufacturer to sell their custom door knobs, and also inform the third party door knob manufacturer when a user has selected their product so that they can send their custom door knobs to the door manufacturer.

In this situation, for example, at least some assembly description files and graphic layer files, corresponding to third party item options, may be supplied by one or more third party suppliers. These third party item options can then be automatically included in an ecommerce shopping cart or order form, so that if a user selects one or more of these third party item options, an automatic notification can be sent to the relevant third party supplier to provide their particular item or product (i.e. the doorknob) to the main manufacturer or assembler of the configured item (i.e. the door) prior to shipment of the finished item (the door).

The IGCP can be implemented using a variety of different programming languages and be run on a variety of different platforms. Some embodiments of the IGCP may be implemented in the form of one or more SWF Adobe Flash Files that can be run on any web browser that has the Adobe Flash Plug-in installed. To do this, the IGCP can first be written using a SWF File creation program such as Adobe Flex. In this embodiment, the SWF file may be loaded in real time by the web browser, and the main description file data (often in XML format) and the various graphic files (often in the form of .gif, or .png file format) may be read from their storage locations on a web server. Alternatively, the IGCP may be implemented in other languages such as HTML5. These alternative languages may be particularly useful for those web browsers that do not run Adobe Flash.

Note that although web server—web browser examples have been used throughout this specification as one way in which the invention's configurator and IGCP can be implemented, these examples are not intended to be limiting. In other embodiments, the configurator and IGCP may be implemented on a single computerized device, which need not necessarily be connected to the internet. A good example of such an alternative embodiment would be an in-store multimedia kiosk. Here customers could use the kiosk to configure various products on the spot, and the store itself may then supply the configured product directly.

The combination of the graphic files and the data files provides effective means for defining an instance of the configurator that can define one or more configurable objects. This definition of the instance of the configurator can be very useful for individuals with or without programming skills to define and communicate regarding the definition of a particular configurator.

In some embodiments, the XML data can also include the price of each element (e.g. assembly price) so that the total price of the product can be calculated and displayed at any time for the exact configuration of the product as chosen by the user. The total price can be calculated as a function of the sum of the prices of the each of the selected assemblies (to which additional amounts can be added or subtracted for shipping, discounts, etc.).

Other Options and Features:

In some embodiments, the invention may allow a designer or users to drag and drop a graphic icon displayed under the headings or in the attributes display window, and place it on a predetermined spot in the item configuration window. Other icon manipulation items that may be provided include options to resize, rotate, or move the icon, as well as options to change the icon color, transparency and/or blendmode. As previously discussed, the application of an attribute such as a color or pattern may be carried out by applying commonly used blending algorithms, similar to those used in software like Flex or Photoshop, using blendmodes such as Overlay or Multiply or Dissolve.

In another optional feature or mode of operation, if a text icon is chosen, the user may be given the ability to add text to a desired area and graphic layer. The user may also be given the option to modify this text accordingly. For example, the user may be given the option to choose the text font and color; resize, rotate, or move the text, as well as to adjust the text transparency and blend mode.

In another optional feature or mode of operation, all steps carried out by the user while configuring the object may be logged (possibly in conjunction with an optional time stamp). This information can later be used to analyze which configurations of an item or product users prefer. The data can also be used to analyze the use of the Configurator, in order to learn how to improve it.

Such easy-to-create configurators can be used by smaller manufacturers and artisans who would like to offer their products online and enable users to customize the products and define the exact look, design, functionality and coloring of the product they wish to purchase. Such easy-to-create configuarators can also be used by internet retailers wishing to offer a variety of customizable products while providing a consistent GUI, enabling users to customize various products without the need to re-familiarize themselves on how to operate the configurator in each case.

The invention claimed is:

1. A method of creating an item configurator intended to run under the control of at least one processor in at least one computerized device possessing a GUI, said method comprising:

creating a plurality of graphic layer files and graphic layer thumbnail files comprising various layers of said item;

wherein at least some of said plurality of graphic layer files contain some transparent pixels;

wherein at least some graphic layer files have the same width and height dimensions in terms of pixels, so that at least some graphic layer files may be superimposed on each other to produce a composite image without the need to specify the relative location of any particular graphic layer file relative to another particular graphic layer file;

creating at least one main description file describing the relationships between said plurality of graphic layer files;

said main description file comprising a plurality of heading sections;

each heading section comprising a heading and at least one assembly definitions;

each at least one assembly definition comprising and being associated with at least one graphic layer file, at least one thumbnail graphic layer file (icon), at least one assembly title descriptor, and an optional link to an associated description file that defines the attributes of said at least one assembly definition;

wherein said main description file or said associated description file further comprises at least some GUI markup information that is not directly displayed on said GUI;

obtaining an interactive generic configurator program (IGCP);

said IGCP capable of reading and parsing said at least one main description file, and implementing a program loop wherein for each heading section in said at least one main description file, said IGCP will:

1: read said heading and display said heading onto said GUI;

2: read the first assembly definition (the default assembly) of each heading and display the graphic layer file associated with said assembly definition into a GUI configurable object display window;

3: read said at least one assembly definition wherein;

A: if said assembly definition contains a link to an associated description file, then said IGCP will apply the attributes associated with this associated description file to the at least one graphic layer file associated with said assembly, and display said attributes in a GUI attribute display window as additional attributes that may be applied should the user click on one of these attributes in the GUI attribute display window;

B: For each assembly definition, said IGCP will display said thumbnail graphic layer file as an icon associated with said display of said heading onto said GUI, and display said at least one assembly title descriptor associated with said display of said heading onto said GUI;

wherein if a user of said configurator selects an icon on said GUI, said IGCP will replace the associated graphic layer files in the item configuration window with new graphic layer files associated with said selected icon, and apply the defined attributes specified by the linked associated description file associated with said icon onto the assembly, 4: when said user indicates on said GUI interface that said user is finished, said IGCP will save a record of the icons selected by said user;

wherein at least some assembly definition files and graphic layer files correspond to third party item options that are supplied by one or more third party suppliers; and said third party item options are included in an ecommerce shopping cart or order form so that if a user selects one or more of said third party item options, an automatic notification can be sent to said one or more third party suppliers to provide said third party item options items to the manufacturer or assembler of the item prior to shipment of the finished item.

2. The method of claim 1, wherein said attributes are selected from the group consisting of colors, patterns, textures, fabrics, materials, and available sizes.

3. The method of claim 1, wherein at least some of said assembly definitions additionally comprise one or more codes representing a price category that can be used to calculate and display the impact of choosing said assembly definition on the price of said item.

4. The method of claim 1, wherein at least some of said assembly definitions additionally comprise one or more interdependency codes that either disable use of other assembly definitions if said assembly definition is chosen by said user, or disable use of said assembly definition if the use of other assembly definitions are chosen by said user.

5. The method of claim 1 used on an Internet based server—web browser ecommerce system;

wherein said IGCP runs in a user's web browser;

at least some of said plurality of graphic layer files are stored in a web server; and said record of the icons selected by said user is stored on said web server.

6. The method of claim 1, wherein said main description file or said associated description file comprises at least some markup information that is not displayed to users.

* * * * *